United States Patent [19]
Kosho et al.

[11] Patent Number: 5,125,142
[45] Date of Patent: Jun. 30, 1992

[54] TURRET HEAD

[75] Inventors: Akira Kosho; Satoru Togawa, both of Abiko, Japan

[73] Assignee: Hitachi Seiki Co., Ltd., Abiko, Japan

[21] Appl. No.: 333,589

[22] Filed: Apr. 5, 1989

[30] Foreign Application Priority Data

Apr. 20, 1988 [JP] Japan .................................. 63-95653

[51] Int. Cl.⁵ ............................................. B23B 29/32
[52] U.S. Cl. .................................... 29/40; 29/27 C; 408/35; 409/144; 409/215; 409/231; 82/159; 74/411.5
[58] Field of Search ............ 29/568, 40, 27 C, 48.5 A, 29/48.5 R, 27 R, 39; 74/813 L, 422; 82/120, 121, 159; 409/203, 137, 231; 279/117; 408/35, 4; 209/144, 215

[56] References Cited

U.S. PATENT DOCUMENTS

| | | | |
|---|---|---|---|
| 2,222,206 | 11/1940 | Stone et al. | 29/40 X |
| 3,718,055 | 2/1973 | Maier | 74/813 LX |
| 3,750,244 | 8/1973 | Smith | 29/40 X |
| 3,830,584 | 8/1974 | Ohlig et al. | 29/40 X |
| 3,872,951 | 3/1975 | Hastings, Jr. | 279/117 X |
| 4,051,583 | 10/1977 | Kato et al. | 29/40 |
| 4,151,753 | 5/1979 | F'Geppert | 74/422 X |
| 4,159,658 | 7/1979 | Parkinson | 74/813 L |
| 4,467,680 | 8/1984 | Kettle | 74/813 L |
| 4,468,991 | 9/1984 | Reusch et al. | 74/813 LX |
| 4,605,122 | 8/1986 | Biddle | 74/661 X |
| 4,620,824 | 11/1986 | Eckstein et al. | 408/57 |
| 4,777,713 | 10/1988 | Kitamura | 29/27 C X |
| 4,785,513 | 11/1988 | Lee et al. | 408/35 X |
| 4,832,545 | 5/1989 | Babel | 409/231 X |

Primary Examiner—Larry Schwartz
Assistant Examiner—Robert Schultz
Attorney, Agent, or Firm—Cushman, Darby & Cushman

[57] ABSTRACT

Disclosed is a structure of a turret head provided with turning tool mounting mechanisms and revolving tool mounting mechanisms on the turret, wherein a turning tool can be mounted on the revolving tool mounting mechanism rotatably mounted on the turret. The turning tool is mounted on the turret at a holder of the tool for positioning and at the same time is tightly affixed to the revolving tool mounting mechanism at the tapered portion of the tool.

Also provided is an engaging and disengaging mechanism for engaging and disengaging a gear of a unit drive shaft relative to a gear of a revolving tool mounting mechanism in preparation for mounting a revolving tool different in direction.

This feature enables a revolving tool different in direction to be driven.

Another feature is a provision of a lock gear. Locking the lock gear allows the revolving tool mounting mechanism to be employed for turning tools. The revolving tool mounting mechanism can be used for revolving tools when the lock gear is unlocked.

1 Claim, 4 Drawing Sheets

TURRET HEAD

BACKGROUND OF THE INVENTION:

1. Field of the Invention

The invention relates to the turret head of a lathe and more particularly to a turret head wherein a turning tool or a revolving tool is interchangeably mounted on a single revolving tool mounting mechanism to perform turning and drilling, end milling or the like operation.

2. Description of the Prior Art

Conventionally, turret lathes are provided with a turret head mounted with multiple numbers of tools on its periphery. Moreover, turret lathes commonly known are equipped with a turret head provided with revolving tools such as drills, end-mills, taps or the like other than turning tools in order to allow follow-up working such as drilling and end-milling operations after turning operations. Furthermore, the main spindle itself retaining the work on its chuck is afforded with a C axis control function in controlling the feed exercised by the NC control, which allows milling the periphery of work pieces. This feature is for the purpose of performing turning and milling operation interchangeably to reduce working time.

However, the above-mentioned turret head cannot be provided with a turning tool at the position where a revolving tool is mounted. As a result, the number of the tools to be mounted on the turret head is restricted.

SUMMARY OF THE INVENTION

One of the objectives of the present invention is to provide a turret head wherein a turning tool can be mounted on a revolving tool mounting mechanism.

Another objective of the present invention is to provide a power transmission mechanism to transmit a rotational drive force to said turret head.

In satisfying the aforesaid objectives, the following measures are incorporated:

In a turret head attached with turning tools and revolving tools, the first measure is the provision of a turret rotationally indexable, a tool mounting mechanism rotatably mounted on said turret and means for angular positioning of said turning tool affixed to said tool mounting mechanism relative to said turret.

A second measure in a turret head attached with turning tools and revolving tools is the provision of a rotationally indexable turret, a tool mounting mechanism rotatably mounted on said turret, a unit drive shaft provided with a gear in mesh with a gear on said tool mounting mechanism, and a means for engaging and disengaging the gear affixed to said tool mounting mechanism and the gear on the said unit drive shaft when a revolving tool unit is attached to said turret.

A third measure in a turret head mounted with turning tools and revolving tools is the provision of a rotationally indexable turret, a tool mounting mechanism provided with a gear rotatably mounted on the turret, a lock gear meshable with said gear provided to restrict rotation of said gear and an engaging and disengaging means for disengaging said lock gear in mesh with said gear when said turret is angularly indexed into position.

By indexing the turret, the revolving tool is indexed at its desired position. By disengaging the mesh of the lock gear locking the revolving tool and by pushing out a drive shaft provided for actuating the revolving tool to revolve unit drive shaft, said unit drive shaft serves to revolve the revolving tool of the revolving tool unit.

On the attachment of the turning tool onto the revolving tool mounting mechanism, said turning tool is angularly fixed in position relative to the turret. In this instance, the lock gear prevents the turning tool from rotation.

DETAILED DESCRIPTION OF THE PREFERRED EMBODIMENTS

Figure 1:
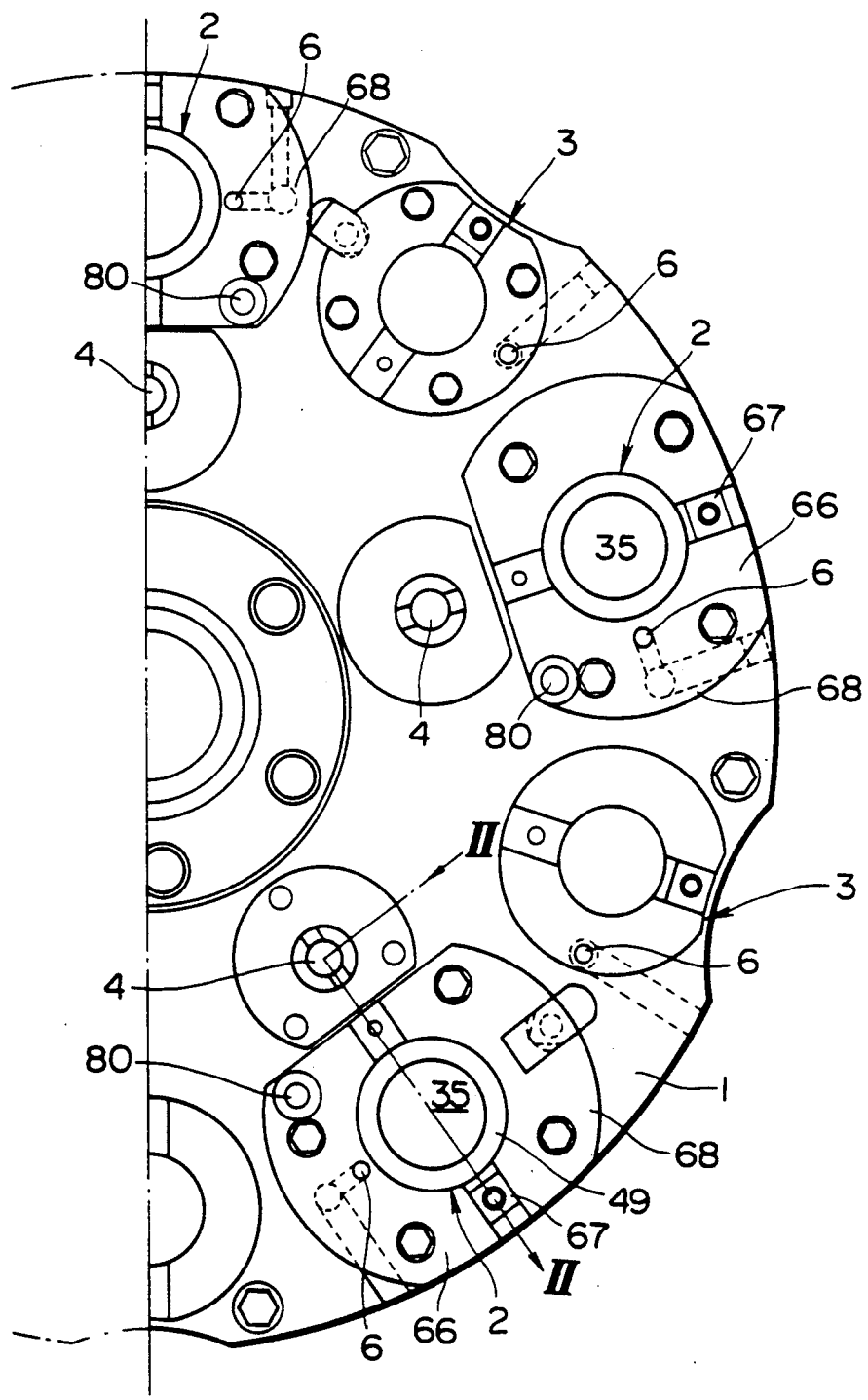
FIG. 1 is a front view showing the turret head according to the present invention.

Preferred embodiments pursuant to the present invention are given hereafter with reference to the appended views. FIG. 1 is a front view of a commonly known drum shaped turret head. A turret is in the form of a circular plate. Five revolving tool mounting mechanisms 2 are provided equispaced around the periphery of the said turret 1. Said revolving tool mounting mechanism can be mounted with turning tools. Turning tool mounting mechanisms 3 are provided between the said revolving tool mounting mechanisms 2. The turret is provided with unit drive shafts 4 for providing power transmission for rotational drive located inward of said revolving tool mounting mechanism, said unit drive shafts providing the rotational drive force to the revolving tool unit 100 through the medium of a clutch.

Revolving tool mounting mechanisms 2 are equipped with flanges 68, said flanges being provided with air ejection holes 6 serving to blow away chips on the end plane 66 of flange 68. The unit-drive shaft 4 serves as the power output shaft in providing the drive force to the revolving tool, said revolving tool facing in the direction of X axis, i.e., in the radial direction of the turret head.

Figure 2A:
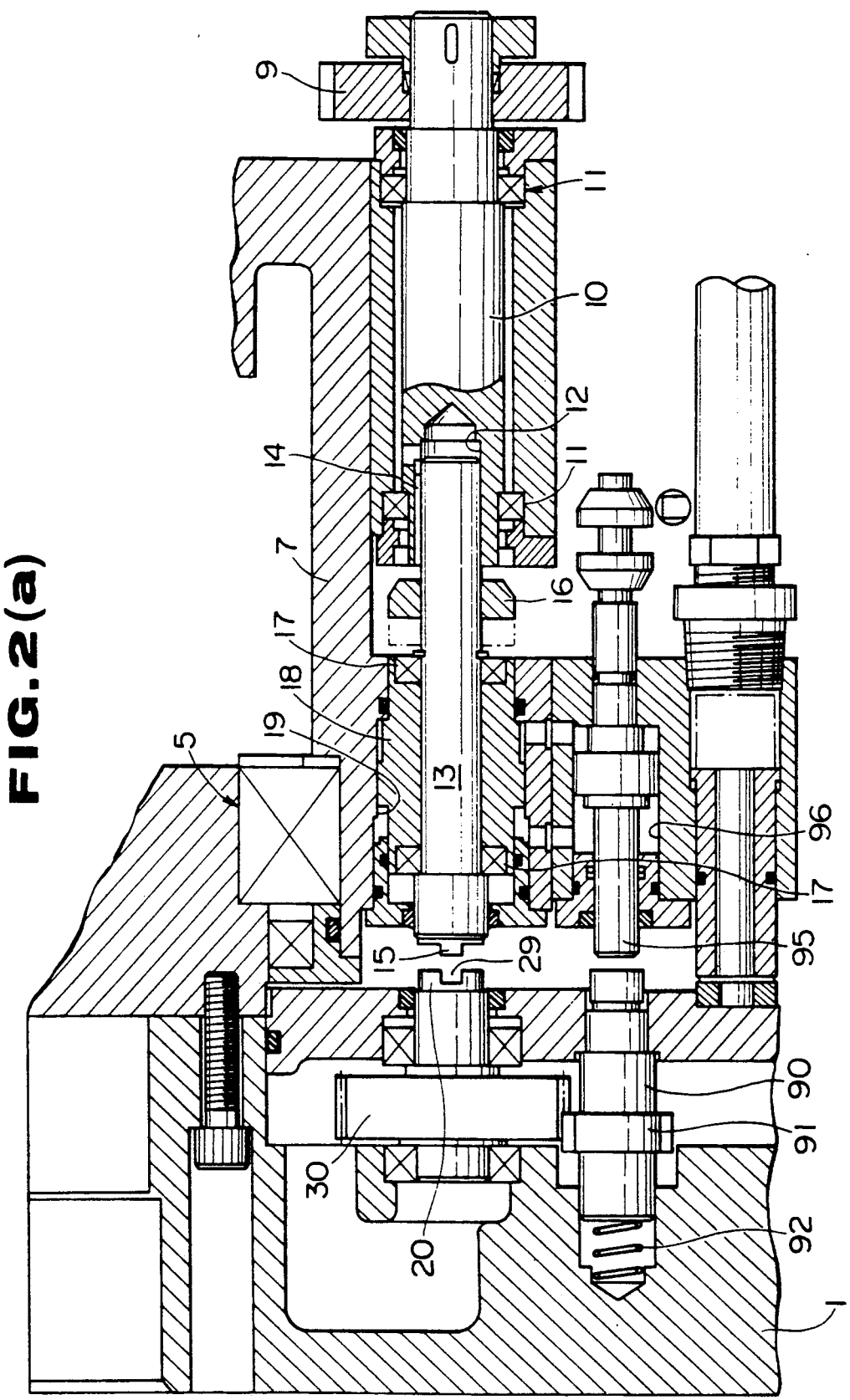
FIGS. 2 (a), (b) and (c) are cross sectional development elevation of the section II—II in FIG. 1 showing the embodiment of the present invention.

FIGS. 2 (a), (b) and (c) are cross sectional development elevations of the section II—II in FIG. 1 wherein the turret 1 is supported by a bearing 5 and rotatably indexed. The element 7 supporting the turret head provides a bearing 11 supporting the input power shaft 10 to allow free rotation of said input power shaft.

The input power shaft 10 is rotationally driven by a drive motor (not shown). One end of said input power shaft is affixed with a geared pulley 9 serving to transmit rotational drive to said input power shaft. At the center of the other end of said input power shaft, a slide hole 12 is provided. An end of drive shaft 13 is slidably inserted axially in the said slide hole via a key 14. The frontal end face of the other end of said drive shaft 13 is formed with a projection 15, which serves to rotationally drive an input drive shaft 20 coupled by the groove 29 provided in said input drive shaft 20.

Projection 15 and groove 29 actually form a clutch. At an intermediate point of drive shaft 13, a dog 16 is provided which serves to detect the displacement of said drive shaft 13. Detection is effected by a limit switch (not shown ). At an intermediate point of said drive shaft 13, two bearings 17 support said drive shaft allowing free rotation of said drive shaft. Said bearings 17 are housed within a piston 18 slidably positioned in cylinder hole 19. With the injection of hydraulic pressure within said cylinder hole, said piston slides within said cylinder hole. With this sliding action, projection 15 provided on the drive shaft 13 is introduced into the groove 29 causing the input power shaft 10 to be rotationally driven which in turn causes the input drive shaft 20 to be rotationally driven. Said input drive shaft is affixed with a gear 30. The gear 30 is engaged with a gear 70. Gear 70 is engaged with a gear 31. Said gear 31 is keyed to sleeve 33 by means of a key 32. Said sleeve is supported by bearings 34 in allowing free rotation, an end of said sleeve being formed with a tool inserting hole 35.

In the center of sleeve 33, an annular center tube shaft 36 is provided for free slidable displacement in the axial direction. A threaded nut 37 is screwed on to the end extremity of said annular center tube shaft. Said nut is slidably free to be displaced in the slide hole 38 provided in said sleeve. Between the forward end face of said nut and said sleeve, a conical disc spring 39 is interposed, said conical disc spring causing said nut and said annular center tube shaft to be pulled backward constantly.

In the central hole of the annular center tube shaft 36, a lock shaft 40 is inserted to be freely displaced axially. An end portion of said lock shaft is of a major diameter, a part of which being provided around its circumference with a semicircular raceway 41 for ball locking. At the forward end of said annular center tube shaft, a ball hole 42 is recessed radially retaining a ball 43. The rear end of the turning tool 50 is formed with a tapered shank 51 introduced and fixed in the tool insertion hole 35.

A fixed recess 52 is formed within said tapered shank, said fixed recess being formed with a ball retaining raceway 53. The end side face 61 of the holder 60 of the turning tool 50 is fixed in close contact with the end surface 66 of the flange 68 fixed to the turret 1. A key 67 is planted in the end face of said flange. The forward end face 49 of sleeve 33 is flush with end surface 66. The plane constituted by forward end face 49 and end surface 66 comes into close contact with end side face 61 when clamped and in this way, said turning tool 50 is rigidly clamped. Further, a key 69 is fixed at the forward end of said sleeve, said key 69 and the key 67 are inserted in the keyway provided in said turning tool thereby constantly maintaining and fixing the requisite angular position of said turning tool and accordingly, it becomes necessary that the turning tool 50 must be fixed at the requisite angular position. For this reason, and as later explained, a lock gear 91 is provided.

Gear 30 is simultaneously in mesh with gear 70, said last gear being fixed to a unit drive shaft 4 and in the center of said unit drive shaft, an open hole is drilled into which said drilled hole, a coil spring 73 is inserted, said coil spring serving constantly to keep said unit drive shaft pushed forward. At the extremity of said unit drive shaft, a projection 72 is provided. A detector shaft 80 is provided in parallel with said unit drive shaft slidably free to be displaced axially and a body 81 greater in diameter than the diameter of said detector shaft is formed at a near central point on said detector shaft. A coil spring 82 is provided and positioned between said body 81 and turret 1, said coil spring serving constantly to push said detector shaft 80 forward. Said detector shaft is affixed with a connector element 83 at its end portion. The other end of said connector element is affixed with a coupling shaft 84, said coupling shaft being displaced in unison with said detector shaft 80. At the end of said coupling shaft, a proximity switch or like detector means is provided. The said detector shaft 80 and said coupling shaft 84 serve to detect whether a revolving tool unit 100 is attached or not, the details of which is presented later on.

Gear 30 is meshed with a locking lock gear 91, said lock gear being fixed to shaft 90 and said shaft 90 immovably fixed to the turret 1 by means of a key. A spring 92 is interposed between said turret and said shaft 90, said spring being positioned to keep said lock gear 91 and gear 30 in mesh. When said gear 30 meshes with said lock gear 91, the rotational motion of gear 30 is restricted. In this way, said lock gear 91 fixes the required angular position of the rotation of gear 70 in mesh with 30 and gear 31 in mesh with gear 70.

An unlocking piston rod 95 is provided and positioned coaxially with shaft 90, said piston rod being contained within a hydraulic cylinder 96. When an hydraulic pressure is applied in said hydraulic cylinder, said piston rod is displaced to depress the end of said shaft 90 so as to disengage the meshing of lock gear 91 and gear 30 causing gear 30 to rotate freely.

MOUNTING OF A TURNING TOOL

Figure 2B:
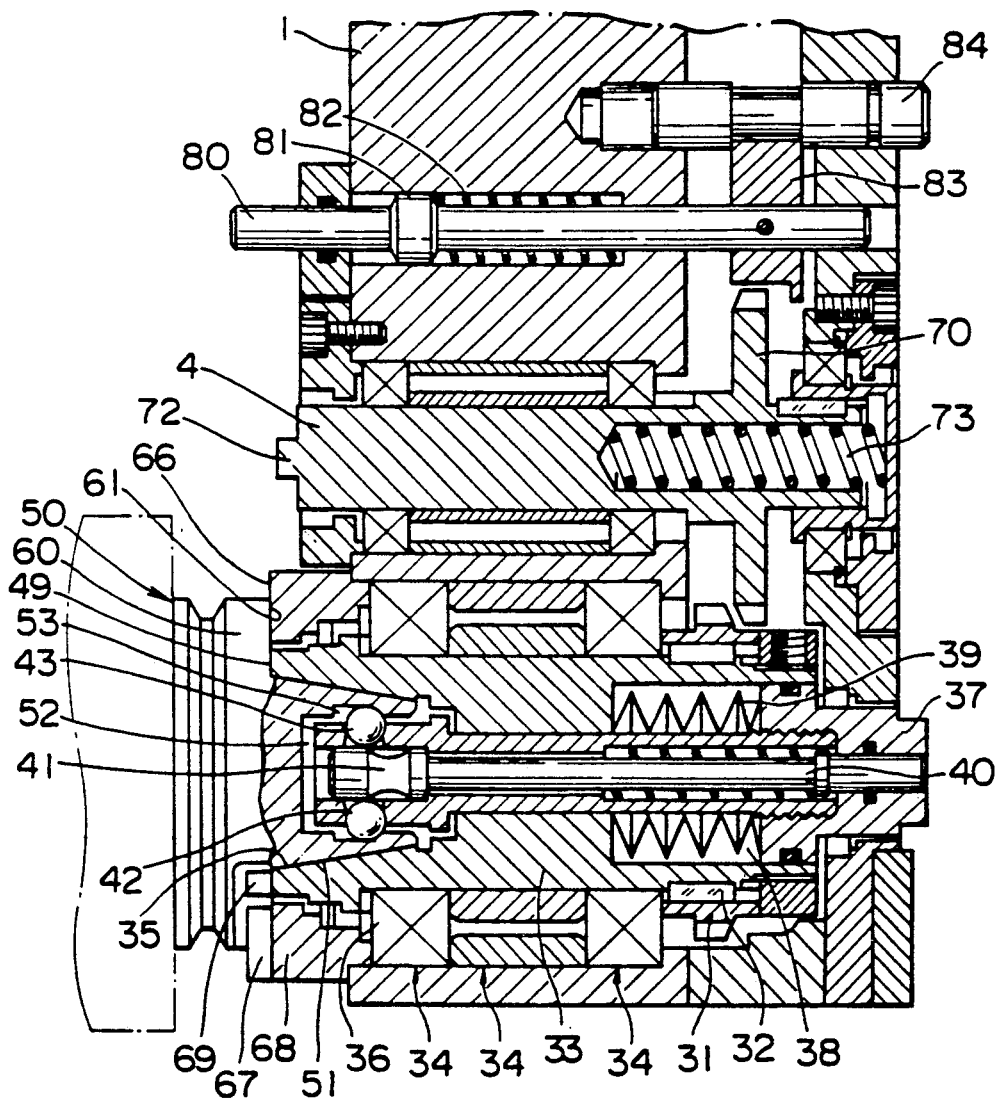

The following procedure is undertaken in fixing the turning tool 50 (shown partially in phantom and partially in solid lines in FIG. 2(b) in the tool insertion hole 35 provided in the revolving tool mounting mechanism 2. In inserting and fixing said turning tool, balls 43 are inserted in raceway 41 since a lock shaft 40 is depressed by a pusher (not shown). When the pressure on said lock shaft by the pusher is removed, conical disc spring 39 forces the nut 37 to be displaced backwards which simultaneously causes the annular center tube shaft 36 to be displaced. Said balls separate from said raceway 41, and is inserted in the ball retaining raceway 53 causing to lock the turning tool 50.

The end side face 61 of the turning tool 50 is disposed in close contact with the end surface 66 of the flange 68. Keys 67 and 69 are inserted into the keyway of the turning tool 50 so that the angular position of the turning tool 50 can be determined. The engagement of the gear 30 with the lock gear 91 prevents the gears 70 and 31 from rotation.

MOUNTING OF THE REVOLVING TOOL UNIT

Figure 2C:
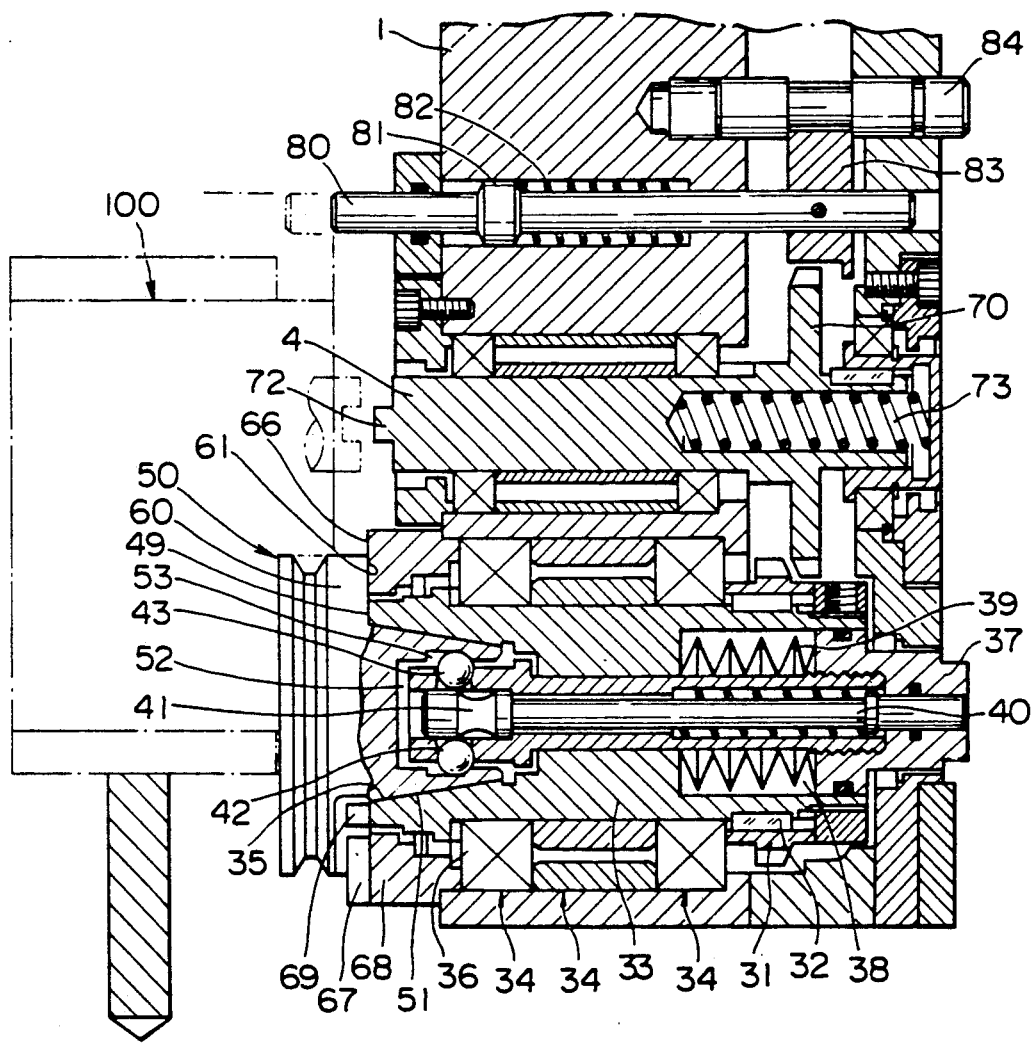

The revolving tool unit 100 (shown partially in phantom and partially in solid lines in FIG. 2(c) provided with a revolving tool facing in the radial direction of the turret head is affixed in close contact with the end surface 66 of flange 68. The positioning of the revolving tool unit 100 causes the projection 72 of the unit drive shaft 4 to be pushed thereby allowing gear 70 to disengage gear 31. The rotation of said unit drive shaft 4 is transmitted via said projection 72 to drive a gear train (not shown) in said revolving tool unit to effect rotation of said revolving tool. In attaching the said revolving tool unit to end surface 66 of flange 68, the detector shaft 80 is always under depression.

Since the detector shaft 80 is pushed forward, connector element 83 and coupling shaft 84 are displaced. By this displacement, judgement is made as to whether or not the revolving tool unit 100 is attached to the turret head. This judgment controls the rotation of the input power shaft 10. Since the revolving shaft line of the revolving tool of said revolving tool unit is directed in the radial direction of the turret 1, the cutting operation can be undertaken from the outer circumference inwardly towards the inward circumference of a work piece. A revolving tool can be inserted into the tool insertion hole 35 axially in the direction of the axis of the main spindle, i.e., in the same axial line of said tool insertion hole. In this instance, key 67 is not inserted in the keyway.

INPUT OF THE ROTATIONAL DRIVE FORCE

The rotational drive force of the revolving tool unit 100 to the revolving tool is accomplished as follows. When the turret 1 is indexed to its requisite angular position, piston 18 is displaced with the introduction of hydraulic pressure into the cylinder hole 19 causing the projection 15 to be inserted into the groove 29 with the displacement of drive shaft 13. Simultaneously with this displacement, piston rod 95 is displaced, pushes a shaft 90 together with its lock gear 91 and in this manner, disengages the meshing of gear 91 and its mating gear 30. Accordingly, gear 30 is freed to rotate freely causing gear 70 to rotate, drives a gear contained within said revolving tool unit to revolve the revolving tool. At this stage, gear 31 is not subject to rotation since gear 70 and gear 31 are not in a meshed state.

As described in detail in the foregoing, this invention allows the rigid fixing of a revolving tool and a turning tool on the same tool mounting mechanism. Further, a selection of the input power shaft can be made depending on the direction of attachment of a revolving tool which obviates inconveniences in taking out driving power. Furthermore, a turning tool can be fixed at a required angular position at all times since a lock gear is provided.

What is claimed is:

1. A turret head comprising:

an indexable turret;

a tool mounting mechanism rotatably mounted to said indexable turret, said tool mounting mechanism having a tool mounting side, said tool mounting mechanism including means for selectively tightly affixing one of a rotary cutting tool unit and a turning tool to said tool mounting side of said tool mounting mechanism;

a first gear mounted on said tool mounting mechanism;

a driving gear for driving said first gear;

an intermediate gear interposed between said driving gear and said first gear, said intermediate gear being mounted so as to always be in mesh with the driving gear, said intermediate gear being disposed so as to be selectively engageable and disengageable with the first gear;

a unit drive shaft extending integrally with said intermediate gear toward said tool mounting side of said tool mounting mechanism; and a resilient member mounted so as to urge said intermediate gear toward said tool mounting side;

whereby, when the rotary cutting tool unit having a rotary cutting tool is mounted to said tool mounting mechanism, the rotary cutting tool unit is engaged with said unit drive shaft so that the rotary cutting tool unit can be driven by the unit drive shaft and said intermediate gear is urged against said resilient member so that said intermediate gear is disengaged from said first gear.

* * * * *